March 3, 1964 H. E. PHILLIPS 3,123,421
ROTATABLE ELECTRICAL CONNECTION
Filed July 10, 1961
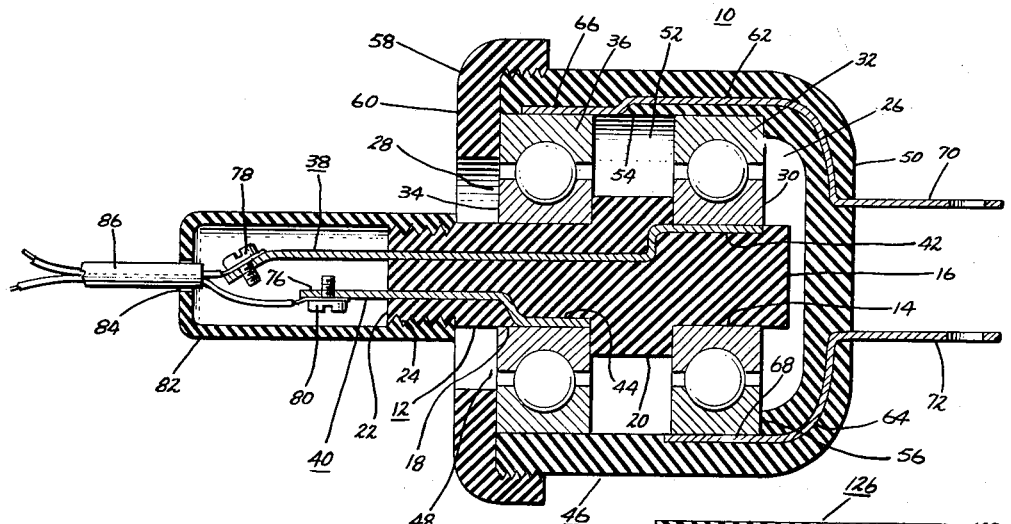
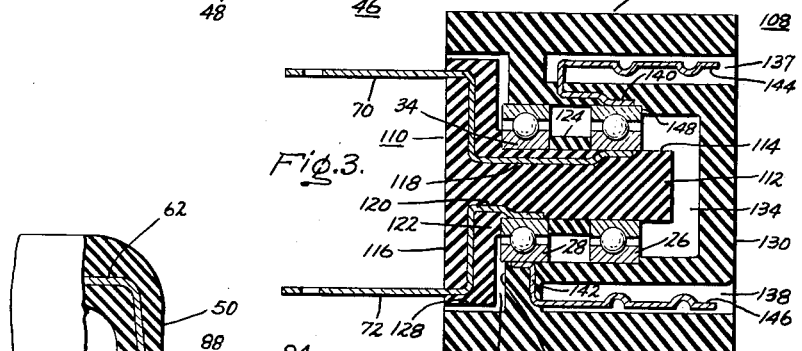
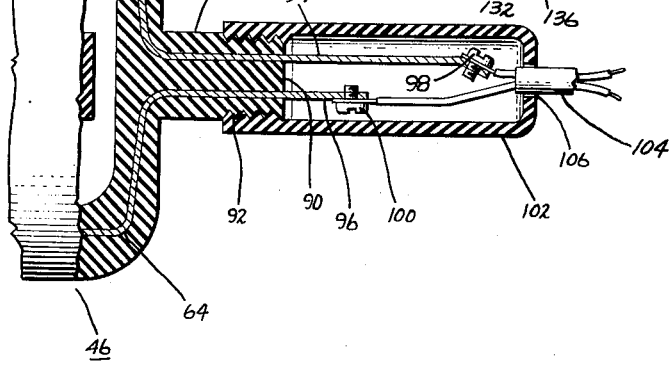
Inventor:
Hermon E Phillips.
by Just & Orish
Attorneys.

United States Patent Office 3,123,421
Patented Mar. 3, 1964

3,123,421
ROTATABLE ELECTRICAL CONNECTION
Hermon Edgar Phillips, Lake James R.R. 2, Angola, Ind.
Filed July 10, 1961, Ser. No. 122,838
6 Claims. (Cl. 339—8)

This invention relates generally to electrical wiring devices, and more particularly to a rotatable electrical connection.

There are many instances where a portable electrical appliance, such as a hand tool or iron, having its cord plugged into a convenience outlet, is manipulated in such a manner that the cord becomes twisted. It is therefore desirable to provide a device which will rotatably connect an electrical cord to a convenience outlet, or rotatably connect two parts of an electrical cord thereby to permit manipulation of the device to which the cord is connected without twisting of the cord. In order to have such a device suitable for domestic use, manifestly it must be characterized by its simplicity, ease of assembly, and relatively low cost. While many rotating electrical connections have been provided for heavy commercial electrical apparatus, to the best of the present applicant's knowledge, no device possessing the requisite simplicity, ease of assembly and low cost has been proposed.

It is therefore an object of my invention to provide an improved rotatable electrical connection.

Another object of my invention is to provide an improved rotatable electrical connection characterized by its simplicity, ease of assembly and relatively low cost.

Further objects and advantages of my invention will become apparent by reference to the following description and the accompanying drawing, and the features of novelty which characterize this invention will be pointed out with particularity in the claims annexed to and forming a part of this specification.

My invention, in its broader aspects, provides a rotatable electrical connection comprising a first member formed of insulating material and having two axially spaced coaxial metallic anti-friction bearings seated thereon. First electrical leads are supported by the first member and respectively connected to the bearings. A second member is provided formed of insulating material and having a cavity formed therein; the first member being disposed in the cavity with the bearings engaging the wall thereof whereby the first and second members are relatively rotatable. Second electrical leads are supported by the second member and are respectively connected to the bearings.

In the drawing:

FIG. 1 is a cross-sectional view showing an embodiment of my invention;

FIG. 2 is a fragmentary view, partly in cross-section showing a modification of the embodiment of FIG. 1; and FIG. 3 is a cross-sectional view showing another embodiment of my invention.

Referring now to FIG. 1, the improved rotatable electrical connection of my invention, generally indicated at 10, comprises a member 12 formed of suitable molded insulating material. Member 12 has a first cylindrical surface 14 extending axially from its end 16 and a second cylindrical surface 18 coaxial with the surface 14 and axially spaced therefrom by a cylindrical shoulder 20. The other end 22 of member 12 is externally threaded as at 24.

A pair of metallic anti-friction bearings 26 and 28 are provided, shown here as being ball bearings. Bearing 26 has an inner race 30 and an outer race 32 and bearing 28 has an inner race 34 and an outer race 36.

Member 12 has electrical leads 38 and 40 molded therein, the lead 38 having a portion 42 which is exposed to the cylindrical surface 14 and lead 40 having a portion 44 which is exposed to the cylindrical surface 18.

Inner race 30 of bearing 26 is pressed onto surface 14 so as to be rotatable therewith and electrically to engage portion 42 of electrical lead 38. Surface 14 may be slightly tapered in order to facilitate pressing the inner race 30 thereon. It will be observed that the inner race 30 is in engagement with the shoulder 20. Inner race 34 of bearing 28 is likewise pressed onto cylindrical surface 18 so as to rotate therewith and electrically to engage portion 44 of lead 40. Again, surface 18 may be slightly tapered in order to facilitate pressing the inner race 34 thereon. It will be seen that inner race 34 is also in engagement with shoulder 20.

An outer, generally cup-shaped housing member 46 is provided formed of molded insulating material and having an open end 48 and a closed bottom 50 defining a cavity 52 therein having a cylindrical inner wall 54.

End 16 of member 12 together with bearings 26 and 28 is positioned in cavity 52, the outer races 32 and 36 of bearings 26 and 28 being pressed into the cavity tightly to engage the wall 54 thereof so as to rotate therewith. Housing 46 has a radially inwardly extending shoulder 56 which is engaged by the outer race 32 of bearing 26. A bearing retainer member 58 threadingly engages the outer surface of housing 46 at its open end 48 and has a radially inwardly extending portion 60 which engages outer race 36 of bearing 28 thus retaining the member 12 and the bearings 26 and 28 in assembled relation, as shown. It will now be seen that members 12 and 46 are relatively rotatable by virtue of bearings 26 and 28.

Member 46 has electrical leads 62 and 64 molded therein, lead 62 having a portion 66 exposed to inner wall 54 and electrically engaging outer race 36 of bearing 28, and lead 64 having a portion 68 exposed to inner wall 54 and electrically engaging the outer race 32 of bearing 26. Leads 62 and 64 extend outwardly from bottom wall 50 of housing 46 and have end portions 70 and 72 respectively defining the prongs of an electrical plug.

Electrical leads 38 and 40 of member 12 have end portions 74 and 76 respectively defining terminals and having suitable terminal screws 78 and 80 threadingly engaging openings therein, as shown. A hollow cap member 82 formed of suitable insulating material threadingly engages threads 24 on end 22 of member 12 and encloses terminals 74 and 76. A suitable opening 84 is formed in the end of the cap member 82 through which electrical cord 86 extends with its wires being respectively connected to the terminal screws 78 and 80, as shown. It will be readily comprehended that the cord 86 may be connected to the appliance or hand tool and the plug 70, 72 inserted in a convenience outlet, the rotatable connection thereby provided preventing twisting of the cord 86 due to manipulation of the tool or appliance.

It will be readily seen that my device is characterized by its simplicity, comprising only six parts, the member 12, housing 46, retainer 58 and cap 82 being readily molded and the bearings 26 and 28 being readily assembled on the member 12.

Referring now to FIG. 2, it may be desired to employ my rotatable electrical connection intermediate the ends of an electrical cord, such as a telephone cord and thus, with like elements being indicated by like reference numerals, a projection 88 extends coaxially outwardly from bottom wall 50 of housing 46 and has its end 90 externally threaded, as at 92. Ends 94 and 96 of electrical leads 62 and 64 extend axially outwardly from end 90 of projection 88 and form terminals with terminal screws 98 and 100 secured thereto, as shown. Another hollow cap member 102 is provided enclosing the terminals 94, 96 and threadingly engaging the threaded end 92 of the projection 88. The other end 104 of electrical lead 86 shown in FIG. 1 extends through an opening 106 in the end of cap 102 with its individual wires being connected to the terminal screws 98 and 100, as shown.

It will be readily seen that a third or ground wire may be provided in lead 86 by merely providing an additional anti-friction bearing in the device.

Referring now to FIG. 3 in which like elements are still indicated by like reference numerals, there is shown an embodiment of my invention, generally identified at 108, adapted to be plugged into a convenience outlet and in turn to have the cord of an electrical appliance plugged therein. Here, a member 110 formed of suitable molded insulating material is provided having a projecting portion 112 with a cylindrical surface 114 formed thereon and an annular shoulder portion 116. Electrical leads 118 and 120 are respectively molded in the plug portion 112 and respectively have portions exposed to the cylindrical surface 114 as shown. Leads 118 and 120 extend radially outwardly in the shoulder portion 116 of member 110 and terminate in axially extending prong portions 70 and 72.

Anti-friction bearings 26 and 28 are provided pressed onto surface 114 of plug portion 112 respectively in engagement with the exposed portions of the electrical leads 118 and 120. In this embodiment, bearing 28 has its inner race 34 abutting shoulder 122 of portion 116 and an annular insulating spacing member 124 is provided separating the ball bearings 26 and 28.

An outer member 126 is provided formed of suitable molded insulating material. Member 126 has an open end 128 and a closed end 130 defining annular cavities 132 and 134 connected by a radial shoulder 136. Member 126 has two diametrically opposite slots 137 and 138 extending inwardly from closed end 130 and respectively radially outwardly from cavity 134. Electrical leads 140 and 142 are provided respectively molded in the member 126 and having portions exposed to the wall of cavity 134. Electrical leads 140 and 142 respectively terminate in contact portions 144 and 146 respectively extending in slots 137 and 138 toward end 130 in the form of elongated leaf springs.

Plug portion 112 of member 110 together with bearings 26 and 28 thereon is positioned in the cavity 134, the outer races of bearings 26 and 28 being pressed into the cavity tightly to engage the wall thereof so as to rotate therewith and electrically to engage the exposed portions of the electrical leads 140 and 142, as shown. Member 126 has a shoulder 148 formed in the wall of cavity 134 which engages the outer race of bearing 26 in order to hold the device in assembled relation. The outer edge of portion 116 of member 110 has a running clearance with the wall of cavity 132, as shown.

It will be seen that the members 110 and 126 are relatively rotatable by virtue of bearings 26 and 28 and it will further be seen that the contact members 144 and 146 are adapted to cooperate with the prongs of a conventional electrical plug attached to an electrical cord of an appliance or hand operated tool.

While I have shown and described specific embodiments of my invention, further modifications and improvements will occur to those skilled in the art and I desire therefore in the accompanying claims to cover all modifications which do not depart from the spirit and scope of my invention.

What is claimed is:

1. A rotatable electrical connection comprising: a first elongated member formed of molded insulating material and having first and second ends and a solid cross-section, said first member having a cylindrical surface; first and second metallic anti-friction bearings respectively having inner and outer races, said inner races being respectively seated on said cylindrical surface of said first member; said first member having electrical leads molded therein and extending out of said first end thereof; said first leads having portions respectively exposed on said cylindrical surface and removably engaging said inner races; and a second member formed of molded insulating material and having a cavity therein defining a cylindrical wall; said first member having said second end thereof extending into said cavity with said outer races respectively engaging into said wall whereby said first and second members are relatively rotatable, said second member having electrical leads molded therein, said second leads having portions respectively exposed on said wall and removably engaging said outer races.

2. The combination of claim 1 wherein the portions of said electrical leads of said first member which extend out of said first end thereof form the prongs of an electrical plug, and wherein the electrical leads of said second member define contact elements for cooperatively engaging the prongs of another electrical plug.

3. A rotatable electrical connection comprising: a first elongated member formed of molded insulating material and having first and second ends and a solid cross-section, said first member having a first cylindrical surface adjacent its second end and a second coaxial cylindrical surface axially spaced from said first surface by an integral cylindrical shoulder; first and second metallic anti-friction bearings respectively having inner and outer races, said inner races of said first and second bearings being respectively seated on said first and second cylindrical surfaces of said first member and in engagement with said shoulder; said first member having two electrical leads molded therein and extending out of said first end thereof, said first leads having portions respectively exposed on said cylindrical surfaces and removably engaging said inner races; a second member formed of molded insulating material and having a cavity extending inwardly from one end and defining a cylindrical wall, said wall having a radially inwardly extending shoulder axially spaced from one end of said second member; said first member having said second end thereof extending into said cavity with said outer races respectively engaging said wall whereby said first and second members are relatively rotatable, said outer race of said first bearing engaging said shoulder; and a member threadingly engaging said one end of said second member and having a radial portion engaging said outer race of said second bearing thereby holding said bearings and said first member in assembled relation in said cavity; said second member having two electrical leads molded therein and extending therefrom, said second leads respectively having portions exposed on said wall and removably engaging said outer races.

4. The combination of claim 3 wherein said first end of said first member extends outwardly beyond said one end of said second member; wherein said first electrical leads have portions respectively defining terminals extending axially outwardly from said first end of said first member; and further comprising a hollow cap member threadingly engaging said first end of said first member and enclosing said terminals.

5. A rotatable electrical connection comprising a first member formed of molded insulating material having a solid cross-section with first and second ends and a cylindrical surface adjacent its second end; first and second metallic anti-friction bearings respectively having inner and outer races, said inner races of said first and second bearings being respectively seated on said cylindrical surface of said first member; said first member having two electrical leads molded therein and extending out of said first end thereof to form the prongs of an electrical plug, said first leads having portions respectively exposed on said cylindrical surface and removably engaging said inner races; a second member formed of molded insulating material and having a cavity extending inwardly from one end and defining a cylindrical wall; said first member having said second end thereof extending into said cavity with said outer races respectively engaging said wall whereby said first and second members are relatively rotatable; said second member having two electrical leads molded therein and respectively having portions exposed on said wall removably engaging said outer races of said bearings, said second member having an end remote from said first end of said first member, said second member having two openings extending therein from said first end thereof respectively radially outwardly from said cavity, said electrical leads of said second member having portions respectively extending into said openings and forming contacts for cooperatively engaging the prongs of another electrical plug.

6. A rotatable electrical connection comprising: a first member formed of molded insulating material, said first member having a plug portion of solid cross-section with a cylindrical surface joined to a radially extending shoulder portion; first and second metallic anti-friction bearings respectively having inner and outer races, said inner races being respectively seated on said cylindrical surface of said plug portion; an annular insulating member axially spacing said bearings; said first member having two electrical leads molded therein having portions respectively extending axially in said plug portion and respectively exposed on said cylindrical surface thereof, said exposed portions of said electrical leads respectively removably engaging said inner races; said electrical leads having portions in said shoulder portion of said first member and extending axially outwardly therefrom to form the prongs of an electrical plug; a second member formed of molded insulating material having an open end and a closed end defining inner and outer annular cavities joined by a radial shoulder; said first member having said plug portion thereof extending into said first cavity with said outer races respectively engaging the wall thereof whereby said first and second members are relatively rotatable, said shoulder portion of said first member being rotatably seated in said second cavity; said second member having two electrical leads molded therein respectively having portions exposed on the wall of said first cavity and removably engaging said outer races, said second member having two elongated slots extending axially inwardly from said closed end thereof and respectively radially outwardly from said first cavity, said electrical leads of said second member having portions extending into said slots and forming leaf-spring contact elements for cooperatively receiving and engaging the prongs of another electrical plug.

References Cited in the file of this patent

UNITED STATES PATENTS

| | | |
|---|---|---|
| 913,831 | Low et al. | Mar. 2, 1909 |
| 1,649,276 | Adam | Nov. 15, 1927 |
| 2,181,145 | Mose | Nov. 28, 1939 |
| 2,328,212 | Heiner | Aug. 31, 1943 |

FOREIGN PATENTS

| | | |
|---|---|---|
| 599,831 | Great Britain | Mar. 22, 1948 |